US010075503B2

(12) United States Patent
Morse et al.

(10) Patent No.: US 10,075,503 B2
(45) Date of Patent: *Sep. 11, 2018

(54) DELAYING PUBLICIZING, AT A SECOND SOURCE, UPLOAD OF A CONTENT ITEM TO A FIRST SOURCE UNTIL CONFIRMATION OF AVAILABILITY OF THE CONTENT ITEM AT THE FIRST SOURCE

(71) Applicant: Google LLC, Mountain View, CA (US)

(72) Inventors: Reed Morse, Palo Alto, CA (US); Jason Toff, New York, NY (US); David Matthew Patierno, San Francisco, CA (US)

(73) Assignee: Google LLC, Mountain View, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/208,687

(22) Filed: Jul. 13, 2016

(65) Prior Publication Data

US 2016/0323354 A1 Nov. 3, 2016

Related U.S. Application Data

(63) Continuation of application No. 14/180,105, filed on Feb. 13, 2014, now Pat. No. 9,413,809.

(51) Int. Cl.
*G06F 15/16* (2006.01)
*H04L 29/08* (2006.01)
(Continued)

(52) U.S. Cl.
CPC .............. *H04L 67/02* (2013.01); *H04L 51/24* (2013.01); *H04L 51/32* (2013.01); *H04L 67/306* (2013.01); *H04W 4/14* (2013.01)

(58) Field of Classification Search
CPC ......... H04L 67/06; H04L 67/26; H04L 67/02; H04L 67/10; H04L 65/403; H04L 51/32;
(Continued)

(56) References Cited

U.S. PATENT DOCUMENTS 8,385,950 B1 2/2013 Wagner et al.
8,805,342 B2 8/2014 Cao et al.
(Continued)

OTHER PUBLICATIONS

Notice of Allowance dated Apr. 6, 2016 in U.S. Appl. No. 14/180,105.
Office Action dated Oct. 8, 2015 in U.S. Appl. No. 14/180,105.

*Primary Examiner* — David R Lazaro
(74) *Attorney, Agent, or Firm* — Byrne Poh LLP

(57) ABSTRACT

Systems and methods are provided for delaying publicizing, at a second source, upload of a content item to a first source, until confirmation of availability of the content item at the first source. In one or more aspects, a system includes an upload component configured to upload content to a content server, a share component configured to receive selection of a sharing source to post a notification that informs users regarding availability of the content at the content server, a confirmation component configured to receive confirmation from the content server in response to the content becoming available at the content server following the upload of the content, and a notification component configured to post the notification at the sharing source in response to receipt of the confirmation.

17 Claims, 10 Drawing Sheets

(51) Int. Cl.
*H04L 12/58* (2006.01)
*H04W 4/14* (2009.01)

(58) Field of Classification Search
CPC . H04L 67/104; H04L 67/1076; H04L 67/306;
H04L 51/08; H04L 63/08; H04L 65/1016;
H04L 65/102; H04L 65/105; H04L 65/60;
H04L 67/32
See application file for complete search history.

(56) References Cited

U.S. PATENT DOCUMENTS

| | | | |
|---|---|---|---|
| 9,413,809 B1* | 8/2016 | Morse | H04L 67/02 |
| 2008/0235592 A1* | 9/2008 | Trauth | G06F 3/0482 |
| | | | 715/733 |
| 2009/0144326 A1 | 6/2009 | Chastagnol et al. | |
| 2011/0060793 A1* | 3/2011 | Wheeler | G06Q 10/00 |
| | | | 709/203 |
| 2011/0150362 A1* | 6/2011 | Mitra | H04N 1/00228 |
| | | | 382/286 |
| 2011/0270921 A1 | 11/2011 | Jones et al. | |
| 2011/0270922 A1 | 11/2011 | Jones et al. | |
| 2011/0270923 A1 | 11/2011 | Jones et al. | |
| 2011/0271192 A1 | 11/2011 | Jones et al. | |

* cited by examiner

DELAYING PUBLICIZING, AT A SECOND SOURCE, UPLOAD OF A CONTENT ITEM TO A FIRST SOURCE UNTIL CONFIRMATION OF AVAILABILITY OF THE CONTENT ITEM AT THE FIRST SOURCE

CROSS-REFERENCE TO RELATED APPLICATION

This application is a continuation of U.S. patent application Ser. No. 14/180,105, filed Feb. 13, 2014, which is hereby incorporated by reference herein in its entirety.

TECHNICAL FIELD

This application generally relates to systems and methods for delaying publicizing, at a second source, upload of a content item to a first source, until confirmation of availability of the content item at the first source.

BACKGROUND

A user may upload user generated content to a server in order for that content to be displayed via a website. For example, an established media sharing system allows users to upload videos for open source sharing with other users via a website. Once a user's content has been uploaded to the website, the user may want to notify his friends that the content has been uploaded and is ready to view. However, there is often a delay between when the upload finishes and when the content is available for online viewing. This forces the user to undertake excessive work. For example, after the user uploads his content, the user must repeatedly check for the content to be available on the website, and then notify his friends once seeing that the content is ready to view. This constant rechecking of the website for availability of the content is a needless waste of bandwidth and time.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
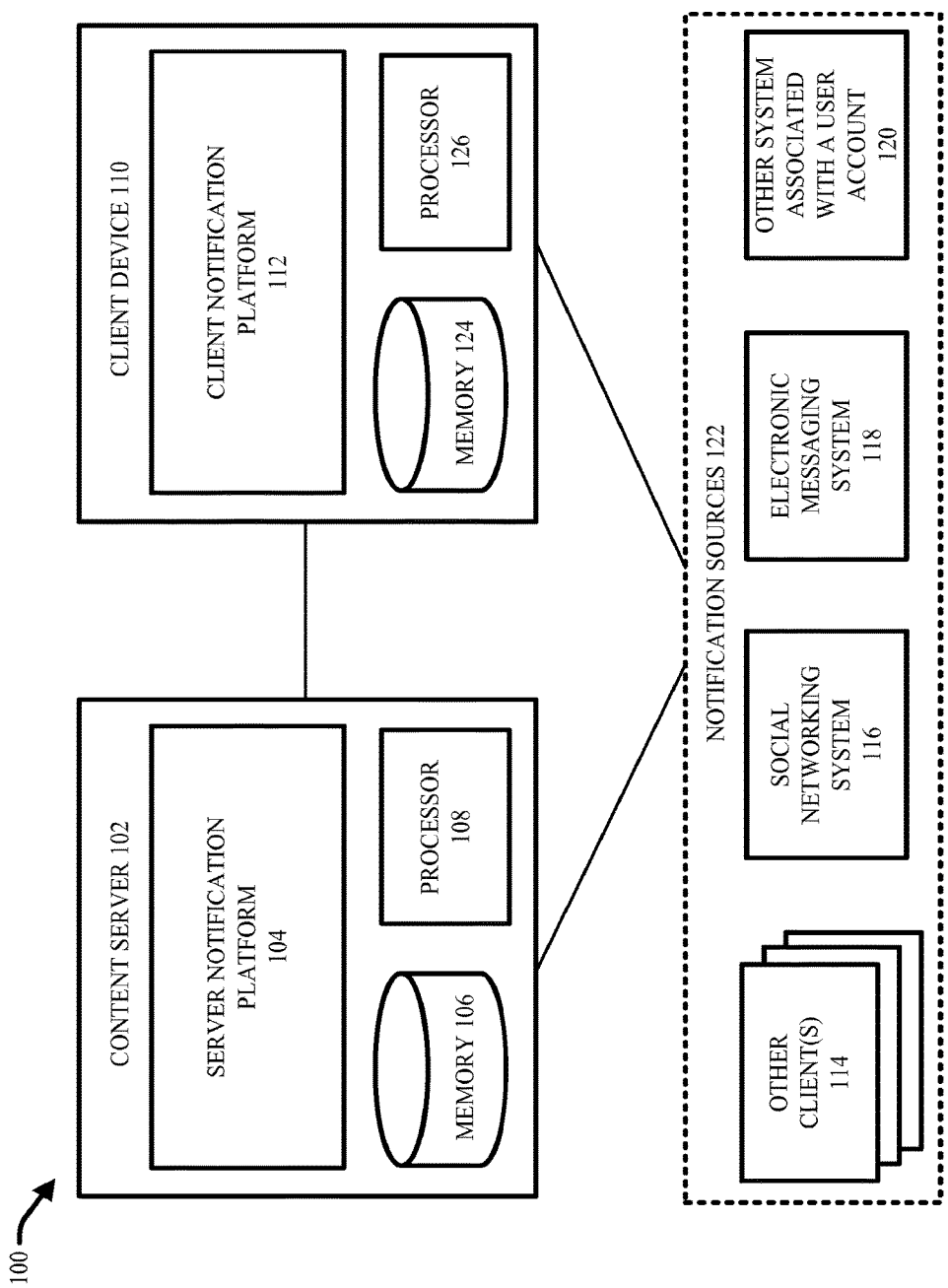
FIG. 1 illustrates an example system for delaying publicizing, at a second source, upload of a content item to a first source, until confirmation of availability of the content item at the first source, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for delaying publicizing, at a second source, upload of a content item to a first source, until confirmation of availability of the content item at the first source. In particular, once a user has uploaded content to a server for display via a website hosted by the server, the user may want to notify his friends that the content has been uploaded and is ready to view at the website. For example, the user may want to post a message at his social networking profile that informs his social network friends that his content has been uploaded to the website. In another example, the user may want to send a short messaging service (SMS) message or email to his friends that informs his friends regarding the upload of his content to the website. However, there is often a delay between when the upload finishes and when the content is available for online viewing at the website. As a result, the user must frequently recheck the website to see if his content has completed upload and been made available for online viewing prior to posting the message at his social network profile or generating and sending the SMS or email message to his friends.

In accommodation of the above scenario, a system is described herein that automatically publishes information notifying other user's regarding the upload of content, by a user, to a content server in response to a determination that the content has been made available for viewing at a website hosted by the content server. The manner in which the information is published or provided to the other user's can vary. In an aspect, the information is provided to the user in the form of a notification message configured for presentation to the other users via notification systems respectively employed by mobile devices of the users. In another aspect, the information is provided to the other users in the form of a feed item that appears in a feed associated with an account of the user, such as a social network profile. According to this aspect, the other users will include friends of the user who have access to the user's social network profile. In yet another aspect, the information is provided to the other users in the form of an electronic message, such as an SMS message or email.

In one embodiment, the system automatically configures the manner in which information indicating that a user's content item has been uploaded and made available at a content provider is provided to the relevant user(s) (e.g., as post at social network, as a mobile notification, as an email, etc.) and what the information includes (e.g., a description content, a link to the content, a personalized message regarding the content, etc.). In another embodiment, the user who uploads the content to the content provider can select how a notification regarding the availability of the content at the content provider is provided to the relevant user(s) and what information the notification includes. For example, in conjunction with uploading the content (e.g., at the time of initiating transmission of the content to the content server), the user can write or select a message that informs others regarding publication of his content, select one or more sources (e.g., social network accounts, personal blogs, devices, etc.,) and/or mechanisms (e.g., as a notification, as a feed item, as an email, etc.) for posting/providing the message and select the user's who are allowed to view the message. Once transfer of the content to the content server is complete and the content is made available for viewing at the content server (e.g., via a webpage hosted by the content server), the system then automatically executes posting/providing of the message to the one or more selected sources. In other words, the system delays posting the message until the content becomes available for viewing at the content server.

In one or more aspects, a system includes an upload component configured to upload content to a content server, a share component configured to receive selection of a sharing source to post a notification that informs users regarding availability of the content at the content server, a confirmation component configured to receive confirmation from the content server in response to the content becoming available at the content server following the upload of the content, and a notification component configured to post the notification at the sharing source in response to receipt of the confirmation.

In another aspect, a method is disclosed that includes sending a content item to a content server, wherein the content server is configured to process the content and provide the content via a network accessible interface in response to receiving the content and receiving selection of a notification source to send a notification that informs users regarding availability of the content at the content server. The method further includes receiving confirmation from the content server in response to the content becoming available at the content server following the upload of the content, and sending the notification to the notification source in response to receipt of the confirmation.

Still in yet another aspect, a system is disclosed that includes an upload component configured to receive uploaded content from a device and a processing component configured to process the uploaded content and make the uploaded content available for access via a network accessible source hosted by the system. The system further includes a confirmation component configured to generate confirmation when the uploaded content is available for access at the source, a sharing component configured to receive, from the device, selection of a sharing source to send a notification regarding availability of the content at the source, and a notification component configured to send the notification to the sharing source in response to the confirmation.

Referring now to the drawings, with reference initially to FIG. 1, presented is a diagram of an example system 100 for delaying publicizing, at a second source, upload of a content item to a first source, until confirmation of availability of the content item at the first source in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes content server 102, client device 110 and one or more external notification sources/locations 122 for receiving a notification regarding availability of a content item uploaded by client device 110 to content server 102. For example, these external notification sources 122 can include but are not limited to, other client devices 114, a social networking system 116, an electronic messaging system 118, and/or another system associated with a user account 120. Client device 110 can include memory 124 for storing computer executable components and instructions and processor 126 to facilitate operation of the instructions (e.g., computer executable components and instructions) by client device 110. Similarly, content server 102 can include memory 106 for storing computer executable components and instructions and processor 108 to facilitate operation of the instructions (e.g., computer executable components and instructions) by content server 102.

The various components of system 100 can be connected either directly or via one or more networks, (not shown). Such network(s) can include wired and wireless networks, including but not limited to, a cellular network, a wide area network (WAD, e.g., the Internet), a local area network (LAN), or a personal area network (PAN). For example, client device 110 can communicate with content server 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Content server 102 can include an entity configured to provide content or content items to a user at a client device (e.g., client device 110 or other client device 114) via a network (e.g., the Internet). For example, content server 102 can include a website or application configured to present pictures, articles, blogs, videos, or other types of content items to client devices via a network. According to this example, the content provided by the website or application can be configured for downloading, streaming or merely viewing at a client device via the network. In another aspect, content server 102 can include an information store that provides access to data included in the information store via a network.

As used herein, the term content item refers to any suitable data object that can be linked to and accessed or otherwise shared via a network and includes but is not limited to: documents, articles, messages, webpages, programs, applications, and media items. In an aspect, a content item includes a data object that can be identified by a URL. The term media content or media item can include but is not limited to: video, live video, animations, video advertisements, music, music videos, sound files, pictures, and thumbnails. In some aspects, the term media content or media item includes a collection of media items, such as a playlist or channel including several videos or songs.

A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

In an exemplary embodiment, content server 102 includes a streaming media provider configured to provide streamed media to client devices over a network. For example, content server 102 can include a media provider that has access to a voluminous quantity (and potentially an inexhaustible number) of shared media (e.g., video and/or audio) files. The media provider can further stream these media files to one or more users at respective client devices (e.g., clients 114 or client device 110) of the one or more users over a network. The media can be stored in memory associated with the media provider (e.g., memory 106) and/or at various servers employed by media provider and accessed by client devices using a networked platform (e.g., a website platform, a cellular application) employed by the media provider. For example, the media provider can provide and present media content to a user via a website that can be accessed by a client device using a browser. In another example, the media provider can provide and present media to a user via a mobile/cellular application provided on a client device (e.g., where the client device is a smartphone or the like).

Client device 110 (and other client device 114) can include any suitable computing device associated with a user and configured to interact with content server 102 via a network. For example, client device 110 can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 110.

Client device 110 can include client notification platform 112 to facilitate configuring information/notifications regarding availability of content uploaded by client device 110 to content server 102 and sending the information/notifications to one or more notifications sources 122. Similarly, content server 102 can include server notification platform 104 to facilitate configuring information/notifications regarding availability of content uploaded by client device 110 to content server 102 and sending the information/notifications to one or more notifications sources 122. Client notification platform 112 and server notification platform 104 can include complimentary and/or same or similar functionality depending on the implementation of system 100.

In one implementation, client notification platform 112 is configured to send (e.g., from client device 110) information/notifications to other users (e.g., using one or more notification sources 122) regarding availability of content at content server 102, uploaded by client device 110 to content server 102. For example, after a user of client device 110 uploads a content item to content server 102, the user may want to share the content item with his or her friends. For instance, the user may want to notify his friends that he has just uploaded a new video to his profile page at content server 102 and direct his friends to go watch the video. Client notification platform 112 is configured to facilitate generating a message for sending to the user's friends (e.g., using one or more notification sources 122) or posting to a community forum accessible to the user's friends (e.g., a social networking system 116), that informs the user's friends regarding the upload of the user's video to content server 102.

According to this implementation, client notification platform 112 can facilitate uploading content from client device 110 to content server 102 (e.g., via a network). For example, client device 110 can upload a video to content server 102 where content server 102 is a media provider named "Media World" configured to make the video available for viewing by other devices via a network accessible interface (e.g., a website). In association with initiation of uploading of the video to content server 102, client notification platform 112 can configure (e.g., based on predetermined criteria and/or based on user input) a notification message for providing to one or more notification sources 122 following receipt of a trigger signal from Media World. The notification message can include information informing another user or users regarding the availability of the video at content server 102. In response to receipt of the trigger signal, client notification platform 112 can send the notification message to the one or more content sources.

In an aspect, the trigger signal can include receipt of confirmation of availability of the video at the content server 102 (e.g., via a webpage hosted by the content server 102). In particular, rather than sending out the notification message at the time of initiation of upload of the video from client device 110 to content server 102, client notification platform 112 can delay sending the notification message until receiving confirmation from server notification platform 104 that the video has completed upload and been made available for viewing at content server 102 (e.g., via a networked interface such as a website). For example, the process of uploading a video (or other data) from client device to content server 102 and processing the video for displaying and making available for viewing at content server 102 (e.g., for streaming from content server via a web based platform or mobile application platform) can require various lengths of time (e.g., from second to minutes) depending on the size of the video and the amount/type of processing associated with the video. As a result, if a notification message informing another user that that video has been uploaded to content server 102 is sent to the other user (e.g., at a notification source 122) prematurely or before the video is video is made available for viewing at the content server 102 (e.g., before completion of uploading and processing of the video), the other user may become aggravated when attempting to find and view in response to the notification message only to learn that the video is not yet available.

According to this aspect, client notification platform 112 can send out a notification informing other users regarding availability of the video at content server 102 after it confirms that the video is in fact available at the content server 102 following completion of upload of the video and any processing associated with making the video available for viewing via a networked interface (e.g., a website) employed by the content server 102. For example, a user of client device 110 can upload a video from client device 110 to content server 102 and employ client notification platform 112 to select, at the time of initiation of the upload, one or more notification sources 122 the user would like to publish a notification regarding the availability of the video at content server 102. For example, the user could choose other client devices 114 (and associated users) for which to provide the notification message as mobile notification or SMS message. Similarly, the user could choose a social networking system 116 at which the user has established a profile for which to publish the notification as a feed item associated with a feed of the user's profile. The user can also select the information to include in the notification message. For example, where the user is named John Lewis, the user can select a notification message that states "John Lewis has just added a new video to his channel at Media World entitled 'Lost in the Dark." The user can also request the notification message include a link to his video at Media World.

After content server 102 receives and processes the video from client device 110 and makes the video available for viewing at content server 102 (e.g., via a website hosted by content server 102), server notification platform 104 can send a confirmation to client device 110 informing client device 110 that the video is in fact available for viewing at the content server 102. In response to receipt of the confirmation from server notification platform 104, client notification platform 112 can then send out or publish the notification message at the one or more selected notification sources 122 (and/or to a designated user or group of users) on behalf of the user of client device 110. As a result, when another user is prompted to find the video at the content server based on receipt of the notification message, the video will be ready and available for viewing/access.

In another implementation, server notification platform 104 (as opposed to client notification platform 112 in the previous implementation) can effectuate the sending or publishing of information/notifications to other users (e.g., using one or more notification sources 122) regarding availability of content at content server 102, uploaded by client device 110 to content server 102. According to this implementation, client notification platform 112 can facilitate uploading content from client device 110 to content server 102 (e.g., via a network). For example, client device 110 can upload a video to content server 102 where content server 102 is a media provider named "Media World" configured to make the video available for viewing by other devices via a network accessible interface (e.g., a website). In association with initiation of uploading of the video to content server 102, client notification platform 112 can send a request (e.g., based on user input) to server notification platform requesting that a notification message be sent to one or more other users (e.g., via one or more notification sources 122) informing the other users that the video is available at content server 102. In an aspect, the request can include information to include in the notification message (e.g., a title of the video, a description of the video, a time stamp associated with publication of the video, a link to the video, information about the uploader, etc.), identification of the one or more user for which to provide the message, and/or selection of the one or more notification sources 122 to publish or send the notification message.

According to this implementation, server notification platform 104 can determine or confirm when the video has completed upload and been made available for viewing at content server 102 (e.g., via a networked interface employed by content server 102). In response to confirmation that the video is available for viewing at content server, server notification message can send out or publish the notification message to the designated user and/or via the designated notification sources. For example, server notification platform 104 can employ an electronic messaging system 118 to configure and send an SMS message or email message to another client device 114 with information indicating the availability of the video at content server 102. In another example, server notification platform 104 can send the notification message to a feed associated with a designated user profile account, (e.g., a user profile account of the uploader of the video) at a social network system 116. According to this example, the notification message can be configured to appear as a feed item at a feed of the user profile account.

The manner and form in which a notification is provided by server notification platform 104 and/or client notification platform, regarding availability of a content item uploaded to content server 102, (herein referred to as an availability notification) can vary. In an aspect, an availability notification can be sent directly to a targeted user's client device 114. As used herein, a user is referred to as a targeted user if the user is designated by an uploader of the content item, to receive an availability notification regarding the content item. For example, server notification platform 104 or client notification platform 112 can configure a notification message for display at a client device 114 of a targeted user via a notification system or application provided at the client device 114. The server notification platform 104 or client notification platform 112 can further send the notification to the client device 114 for processing thereof. According to this example, the notification can be presented to the targeted user along with various other notifications, unrelated to notifications generated by server notification platform 104 or client notification platform 112 (e.g., unrelated to availability notifications). In another aspect, an availability notification can be provided to a targeted user via a notification message sent to the client device 114 of the targeted user as an SMS message or multimedia message. According to this aspect, server notification platform 104 or client notification platform 112 can configure the SMS message and employ a short messaging service to deliver the message to the client device 114. In another aspect, server notification platform 104 or client notification platform 112 can configure a movement and/or modification notification message as an email and notification posting component can employ an electronic messaging system to send the email to an email account employed by a target user.

In yet another aspect, server notification platform 104 or client notification platform 112 can configure a movement or modification notification for rendering as a feed item at an information feed owned or under the control of the uploader of the content item to content server or a targeted user. The information feed can display a list of feed items representing activity associated with content sources the uploader and/or targeted user is affiliated with (e.g., content server 102 and/or a particular channel, webpage, user account, etc, associated with content server). In an aspect, the information feed is provided by content server 102. According to this aspect, the information feed can be associated with a user account for the uploader or a targeted user established by the uploader or targeted user, respectively, with the content server 102 and include feed items regarding activity related to various activity associated with content server. In another aspect, the information feed can be provided at an account of the uploader or a targeted user at an external social networking system 116 and include feed items related to activity at the external social networking system that the uploader or targeted user is affiliated with (e.g., activity associated with friend's profiles).

Figure 2:
FIG. 2 presents an example user interface displaying a notification informing a user that content has been uploaded and made available at a media provider, in accordance with various aspects and embodiments described herein.

FIG. 2 presents an example user interface 200 at which an availability notification is presented in accordance with various aspects and embodiments described herein. In particular, interface 200 includes an availability notification 206 regarding a video uploaded to a media provider, Media World, by user "John Lewis." Interface 200 is generated at a mobile device of a targeted user that John Lewis requested the availability notification regarding his video be provided to. For example, the targeted user can be a friend of John Lewis. The availability notification 206 can be generated and sent by server notification platform 104 or client notification platform 112 in accordance with aspects described herein. In particular, the availability notification 206 can be sent by either server notification platform 104 or client notification platform 112 in response to confirmation that the video has completed upload at Media World and has been made available for viewing at Media World (e.g., via a website or cellular application employed by Media World).

Interface 200 includes various notifications relevant to the targeted user of the mobile phone. For example, the interface includes notifications related to Prime News 202, Media World 204, and ChatRoom 208. In an aspect, Prime News 202, Media World 204, and ChatRoom 208 are content providers frequently visited by the user and/or for which cellular applications associated with the respective content providers are provided on the mobile phone. In an aspect, the availability notification 206 related to Media World 204 was generated by and received from server notification platform 104 or client notification platform 112, as described herein. For example, the availability notification 206 indicates that John Lewis added a new video to his channel at Media World (e.g., a media provider). The availability notification also includes a link to the video at Media World. In an aspect, a notification system employed by the mobile phone can be configured to receive process and present the availability notification 206 via interface 200.

Figure 3:
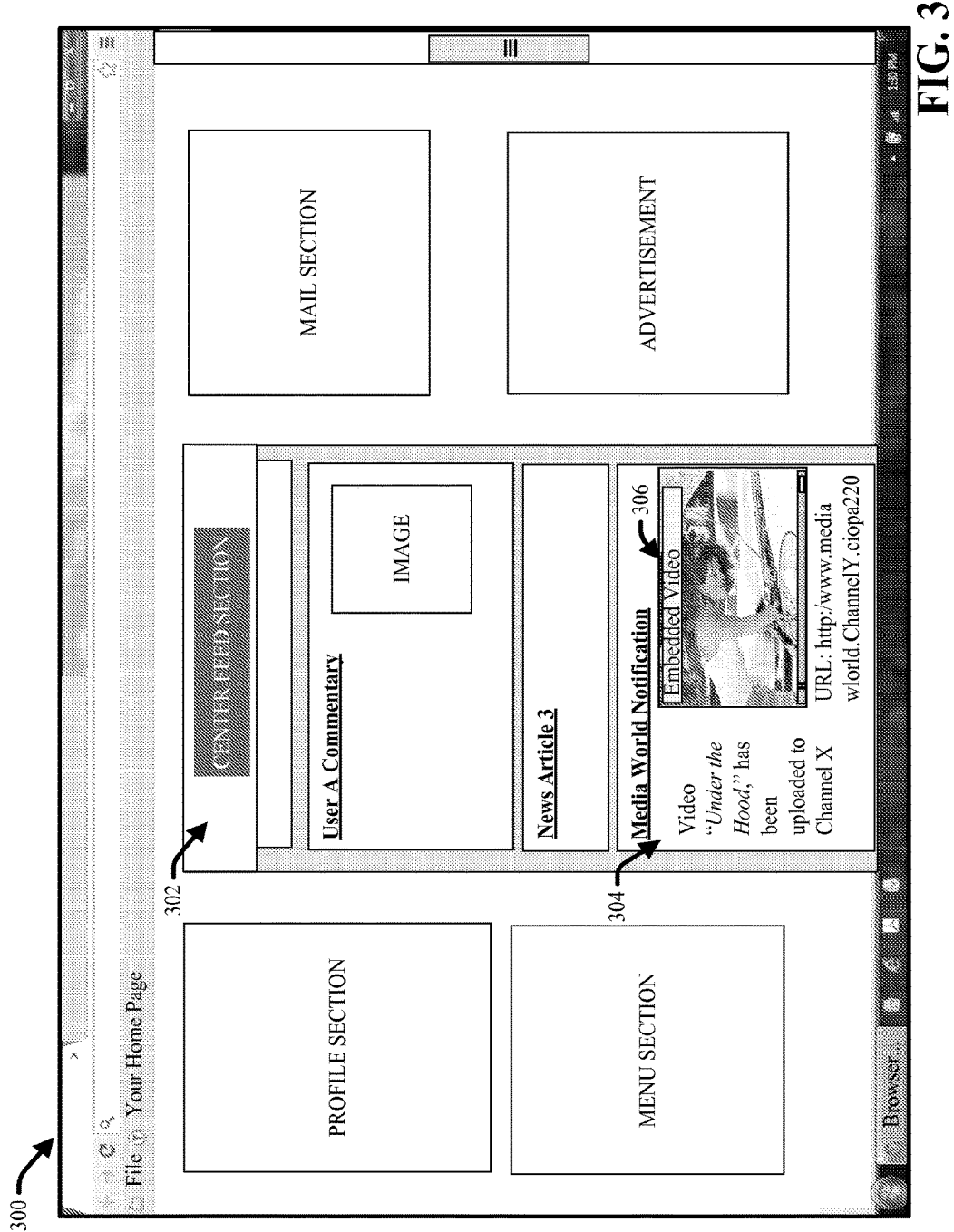
FIG. 3 presents another example user interface displaying a notification informing a user that content has been uploaded and made available at a media provider, in accordance with various aspects and embodiments described herein.

FIG. 3 presents another example user interface 300 at which an availability notification is presented in accordance with various aspects and embodiments described herein. In particular, interface 300 including availability notification 304 displayed as a feed item in an information center feed 302 associated with a user account. The user account can be provided by a variety of systems. In an aspect, the user account is associated with a media provider that provides streaming media. In another aspect, the user account is associated with a social networking system. In yet another aspect, the user account can be associated with web browsing system that presents information to the user relevant to various network sources the user is subscribed to or has indicated in interest in.

Center feed section 302 includes an availability notification 304 related to content provider Media World that is configured to be displayed as feed item in center feed section 302. For example, the availability notification 304 indicates that a video entitled "Under the Hood," has been uploaded to Channel X and includes an embedded version of the video 306. Availability notification 304 is generated and sent be either server notification platform 104 or client notification platform 112 in response to confirmation of availability of video "Under the Hood" at Media World. In an aspect, the availability notification 304 is displayed as a feed item at a user account of a targeted user selected by the user who uploaded the video "Under the Hood" to Channel X. In another aspect, the availability notification 304 is displayed as a feed item at an account of the user who uploaded the video "Under the Hood" to Channel X.

Figure 4:
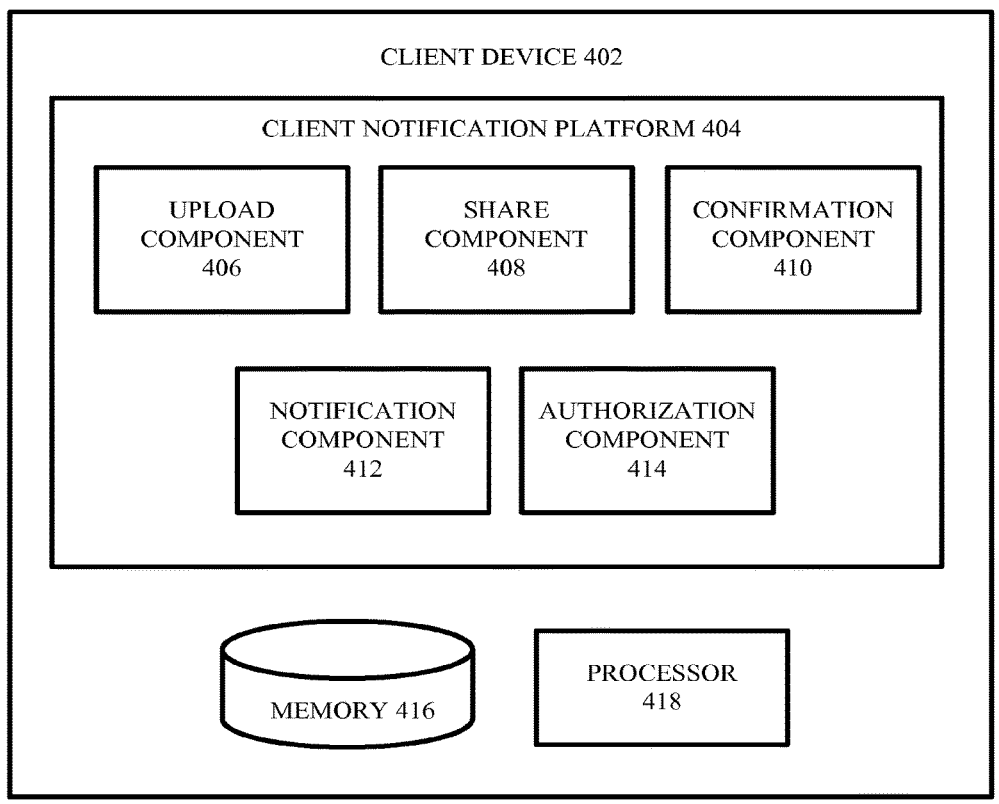
FIG. 4 presents an example client device that facilitates delaying publicizing, at a second source, upload of a content item to a first source, until confirmation of availability of the content item at the first source, in accordance with various aspects and embodiments described herein.

FIG. 4 illustrates an example client device 402 employing a client notification platform 404 to delaying publicizing, at a second source, upload of a content item to a first source, until confirmation of availability of the content item at the first source, in accordance with aspects and embodiments described herein. Client device 402 can include same or similar features and functionalities as client device 110 and client notification platform 404 can employ same or similar features and functionalities as client notification platform 112. Client device 402 can include memory 416 for storing computer executable components and instructions and processor 418 to facilitate operation of the instructions (e.g., computer executable components and instructions) by client device 402. Repetitive description of like elements employed in respective embodiments of systems described herein is omitted for sake of brevity.

Client notification platform 404 includes upload component 406, share component 408, confirmation component 410, notification component 412 and authorization component 414. Upload component 406 is configured to upload (or send, transmit, transfer, etc.) a content item from client device 402 to another source or device. In particular, upload component 406 can send a content item to a content server (e.g., content server 102 and the like) configured to publish the content item via a network accessible interface. For example, upload component 406 can upload a video (or other type of media item) to a media provider that is configured to process the video and make the video available for public viewing at a website or other network accessible interface (e.g., a mobile application, an Internet enable television interface, etc.).

Share component 408 is configured to receive user input regarding whether to notify and how to notify, other users regarding upload of a content item from client device 402 to another source. For example, after a user of client device 402 uploads a content item (e.g., a video) to a networked content provider (e.g., the media provider) for sharing via a website and/or application employed by the content provider, the user may want to notify his friends via an email, a text message, a social network posting, etc., regarding the upload so that the user's friends will go check out the uploaded content item as provided by the content provider. In view of this example, in association with uploading the content item (e.g., prior to initiation of uploading or upon initiation of uploading), share component 408 can provide the uploader with an option to share a notification (e.g., an availability notification) regarding the uploaded content item. For example, an uploader of client device 402 can upload a video to networked media provider for provision on the user's personal channel (e.g., profile and associated webpage) established with the media provider. Using share component 408, the uploader can request a notification be posted in association with uploading of the video to inform his friends regarding the upload. For instance the uploader can request a notification be posted to his social network profile that tells other user's to check out his new video on his personal channel at the media provider and include a link to the new video. In another example, the uploader can request a notification be sent to his friends as an email, text message, mobile notification or voicemail.

In association with selection of the option to share a notification regarding an uploaded content item, share component 408 can receive information regarding who (e.g., other users or devices of the other users) to provide the notification to, how to provide the notification (e.g., as an email, as an SMS message, as a post to a social network account, as a feed item at a social network account, etc.) and/or what information to include in the notification. For example, when a user of client device 402 begins the process of uploading a content item from client device 402 to an external content server (e.g., prior to sending of the content item or at initiation of sending the content item), share component 408 can provide a prompt to the user that asks the user whether the user would like to share information regarding the uploaded content item. The user can then either request to share or deny sharing.

In response to a request to share, share component 408 can receive a selection of how to provide the share (e.g., what notification source 122 to provide the notification and form of the share) and/or who to provide the share to (e.g., user name and/or contact information). For example, the share can be in the form of a mobile notification, an email, an SMS message, and a post to a social network profile or a voice message. In an aspect, the uploader can request a notification be sent to an account the uploader has established with the source to which the content item is uploaded or another source. In another aspect, the uploader can request a notification be sent to an account another user has established with the source to which the content item is uploaded or another source.

For example, the uploader can choose to send information regarding an uploaded content item (e.g., an availability notification) to his social network profile for rendering as a feed item or other form of post on his social network profile page. Similarly, the user can choose to send the information regarding the upload as a mobile notification to another user. According to this example, the user can provide (or select from a drop down menu) contact information for the other user. It should be appreciated that the disclosed mechanisms for posting or providing notifications and/or messages regarding uploaded content are merely examples and not intended to limit the scope of the subject disclosure.

Share component 408 can also receive information regarding what to include in a notification (e.g., an availability notification) regarding an uploaded content item. For example, share component 408 can received a personalized message from the uploader regarding the uploaded content item. According to this example, the user can want to write a message for providing to others regarding the uploaded content item. The message can include a variety of user desired information, such as information that describes the content item, describes the uploader, describes the source where the content item is uploaded, advertises other content items, etc. Share component 408 can also receive selection of whether to include a link to the content item at the source where the content item is uploaded and/or whether to embed the content item (e.g., an embedded video) in the notification. In aspect, the manner and form of the notification can be preconfigured. For example, the information included in a notification for an uploaded video can be preconfigured to include a title of the video, a link to the video, a name of the uploader of the video, a name of a channel of the video and/or a time stamp for the upload.

In accordance with aspects described herein, a notification regarding an uploaded content item (e.g., an availability notification) can be provided to the designated user(s) and/or notification source(s) (e.g., based on information received by share component 408) following upload of the content item and in response to a trigger event. In an aspect, the trigger event includes confirmation of availability of the content item at the content server to which the content item was uploaded. For example, where the content item is a video, depending on the duration of the video, the processing associated with the video at the content server, and the load of the content server, a significant amount of delay can occur between the time at which upload of the video is initiated and when the video becomes available for viewing via a networked interface (e.g., a website, an application, an Internet enabled television, etc.) employed by the content server. Accordingly, provision of a notification regarding an uploaded content item (e.g., an availability notification) can be delayed until confirmation that the content item is in fact available for viewing and/or access at the source to which the content item was uploaded.

In an embodiment, information received by share component 408 regarding who to provide, how to provide, and what information to include in, a notification regarding an uploaded content item, is sent from client notification platform 404 to the content server to which the content item is uploaded. According to this embodiment, the content server then handles configuring and sending/providing the notification in response to the trigger event. For example, the content server can process the uploaded content item and determine when the content item is available for viewing/access at the content server. Upon confirmation of availability, the content server can configure the notification (e.g., based on information received and provided by share component 408) and send or post the notification to the designated notification source and/or user.

In an aspect, the designated notification source can include a source that requires user authorization to receive the notification. In particular, where the uploader has requested the availability notification be posted to an account of the user (e.g., a social networking profile) or using an account of the user (e.g., an email account), the content server will need authorization from the uploader to post/send the availability notification. According to this aspect, when the uploader requests a notification regarding an uploaded content item to be sent to a source that requires user authorization, authorization component 414 can request and receive the authorization. For example, authorization component 414 can have the uploader sign into the source (e.g., sign into his social network account, sign into his email account, etc.). Upon signing in, authorization component 414 can receive/generate an authorization token that can be used by the content server to send the availability notification to the source. In an aspect, authorization component 414 can pass this authorization token to the server in association with the information sent to the server received by share component 408. (This embodiment is discussed in greater detail infra with respect to FIG. 5).

In another embodiment, confirmation component 410 is configured to receive confirmation that a trigger event has occurred. For example, confirmation component 410 can receive confirmation from the content server to which a content item was uploaded to from client device 402 that the content item has completed upload and is available for access/viewing at the content server. According to this embodiment, in client notification platform 404 can handle configuration of the notification and sending/providing the notification in response to the trigger event. For example, upon receipt of confirmation of availability of the uploaded content item at the content server, notification component 412 can configure an availability notification (e.g., based on information received and provided to share component 408 at the time of upload) and send or post the notification to the designated notification source and/or user. In another aspect, confirmation component 410 can inform the user of client device 402 regarding confirmation of availability of the uploaded content item at the content server. In response to receipt of this confirmation, the user can then manually configure and send out an availability notification regarding the uploaded content item.

In an aspect, when the uploader requests a notification regarding an uploaded content item to be sent to a source that requires user authorization, authorization component 414 can request and receive the authorization. For example, authorization component 414 can have the uploader sign into the source (e.g., sign into his social network account, sign into his email account, etc.). Upon signing in, authorization component 414 can receive/generate an authorization token that can be used by notification component 412 to send the availability notification to the source.

In an aspect, various other events can be defined as trigger events, aside from availability of an uploaded content item at the content server to which it was uploaded. For example, a content item can be associated with a compilation of content items or a piece of a larger content item. According to this example, a trigger event can include availability of the compilation of content items or the larger content item at the content server. In another example, a content item can include several parts or pieces. According to this example, a trigger event can include the availability of one of the parts or pieces at the content server. In another example, where the content item is a video, a trigger event can include availability of a first portion of the video. For example, where a first half of a video is processed and made available for viewing, a user can begin watching the first half of the video as processing of the second half of the video continues. By the time the user reaches the second half of the video while viewing, processing of the entire video can be complete. Accordingly, a trigger event can include availability of a sufficient portion of a video such that viewing of the video can commence with assurance that processing of the video will continue as the video is played so that the video will play from start to finish without any breaks or delays.

Regardless of the definition of a trigger event, confirmation component 410 can receive confirmation that the trigger event has occurred. In response to receipt of the confirmation, notification component 412 can configure and send out the notification to the designated users and/or sources based on information received by share component 408. According to this aspect, share component 408 can also receive user input that defines a trigger event. This information can further be sent from client notification platform 404 to the content server and employed by the content server to determine occurrence of the trigger event.

For example, an availability notification can be the default notification. In another aspect, an uploader of a content item can request that an availability notification be sent regarding an uploaded content item when the content item is available at the server to which it is uploaded. In other aspects, the uploader can define a variety of other trigger events that control when a notification regarding an uploaded content item is to be sent. For example, a trigger event can be dependent upon a certain point in time (e.g., Dec. 3, 2015 at 2 pm), completion of a project the content item is included in, logging in of another user to the source where the notification is to be sent, location of another user to which the notification will be sent, commenting on the uploaded content item, sharing of the uploaded content item, amount of viewing of the uploaded content item, or a variety of other contemplated factors.

Figure 5:
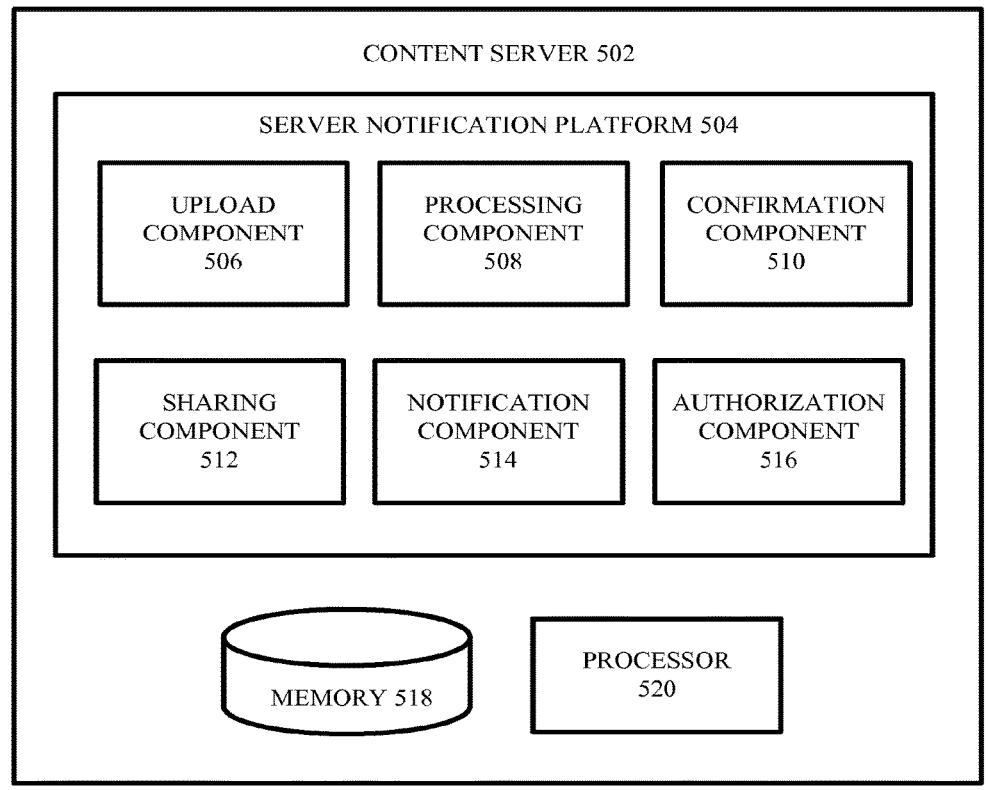
FIG. 5 presents an example content server that facilitates delaying publicizing, at a second source, upload of a content item the content provider, until confirmation of availability of the content item at the content provider, in accordance with various aspects and embodiments described herein.

FIG. 5 illustrates an example content server 502 employing a server notification platform 504 to delaying publicizing, at a second source, upload of a content item to the content server, until confirmation of availability of the content item at the content server, in accordance with aspects and embodiments described herein. Content server 502 can include same or similar features and functionalities as content server 102 and server notification platform 504 can employ same or similar features and functionalities as server notification platform 104. Content server 502 can include memory 518 for storing computer executable components and instructions and processor 520 to facilitate operation of the instructions (e.g., computer executable components and instructions) by content server 502. Repetitive description of like elements employed in respective embodiments of systems described herein is omitted for sake of brevity.

Server notification platform includes upload component 506, processing component 508, confirmation component 510, sharing component 512, notification component 515 and authorization component 516. Upload component 506 is configured to receive a content item from another device or source (e.g., client device 402 and the like) as an upload to another source or device. For example, upload component 506 can receive a video (or other type of media item) in association with a request to process the video and make the video available for public viewing at a website or other network accessible interface (e.g., a mobile application, an Internet enable television interface, etc.) employed by content server 502. Processing component 508 is configured to process the uploaded content item and make the available for viewing/access at a website or other network accessible interface (e.g., a mobile application, an Internet enable television interface, etc.) employed by content server 502.

Confirmation component 510 is configured to confirm occurrence of a trigger event that controls sending of a notification regarding the uploaded content item to another user and/or notification source (e.g., a notification source 122). For example, confirmation component 510 is configured to determine when a content item received at content server 502 can completed upload and processing and has been made available for access/viewing at a network interface employed by the content server. In another example, confirmation component 510 can confirm when a compilation content item formed using an uploaded content item is completed and made available for viewing at the content server. In an aspect, information defining a trigger event can be received from the client device that uploaded the content item to content server 502. In another aspect, a trigger event can be predefined by server notification platform. For example, availability of an uploaded content item can be a default trigger event for which notifications regarding the uploaded content item are based.

In one embodiment, (discussed with respect to FIG. 4) in response to determination of occurrence of a trigger event, confirmation component 510 is configured to send confirmation of the trigger event back to the client device from which the uploaded content item was received. According to this embodiment, configuration and sending of an availability notification is performed at the client device.

In another embodiment, confirmation component 510 is configured to provide confirmation of the trigger event to notification component 514. Upon receipt of confirmation of a trigger event, notification component 514 is configured to configure and send out or post a notification (e.g., an availability notification) regarding the uploaded content item to another user and/or notification source (e.g., a notification source 122). According to this embodiment, in association with receiving an uploaded content item, sharing component 512 can receive user input regarding whether to notify and how to notify, other users regarding a content item to content server. Notification component 514 can then employ this information to configure and send out the notification.

In particular, in association with receiving an uploaded content item (e.g., prior to initiation of uploading or upon initiation of uploading), sharing component 512 can receive a request to post or send a notification regarding the uploaded content item to another user and/or source. For example, the uploader can request a notification be posted to his social network profile that tells other user's to check out his new video on his personal channel at the media provider and include a link to the new video. In another example, the uploader can request a notification be sent to his friends as an email, text message, mobile notification or voicemail. In association with receipt of a request to share a notification regarding an uploaded content item, sharing component 512 can receive information regarding who (e.g., other users or devices of the other users) to provide the notification to, how to provide the notification (e.g., as an email, as an SMS message, as a post to a social network account, as a feed item at a social network account, etc.) and/or what information to include in the notification. For example, the share can be in the form of a mobile notification, an email, an SMS message, a post to a social network profile, or a voice message. In an aspect, the uploader can request a notification be sent to an account the uploader has established with the source to which the content item is uploaded or another source. In another aspect, the uploader can request a notification be sent to an account another user has established with the source to which the content item is uploaded or another source.

Sharing component 512 can also receive information regarding what to include in a notification (e.g., an availability notification) regarding an uploaded content item. For example, sharing component 512 can received a personalized message from the uploader regarding the uploaded content item. According to this example, the user can want to write a message for providing to others regarding the uploaded content item. The message can include a variety of user desired information, such as information that describes the content item, describes the uploader, describes the source where the content item is uploaded, advertises other content items, etc. Sharing component 512 can also receive selection of whether to include a link to the content item at content server and/or whether to embed the content item (e.g., an embedded video) in the notification.

As noted above, notification component 514 is configured to generate and and/or effectuate sending/posting of a notification regarding an uploaded content item, based on information received at sharing component 512, in response to determination of confirmation of a trigger event by confirmation component 510. For example, upon confirmation of availability of an uploaded content item at content server 502, notification component can configure the notification (e.g., based on information received and provided to sharing component 512 by the uploader) and send or post the notification to the designated notification source and/or user.

In an aspect, the designated notification source can include a source that requires user authorization to receive the notification. In particular, where the uploader has requested the availability notification be posted to an account of the user (e.g., a social networking profile) or using an account of the user (e.g., an email account), the content server will need authorization from the uploader to post/send the availability notification. According to this aspect, when the uploader requests a notification regarding an uploaded content item to be sent to a source that requires user authorization, authorization component 516 can request and receive the authorization. For example, authorization component 516 can have the uploader sign into the source (e.g., sign into his social network account, sign into his email account, etc.). Upon signing in, authorization component 516 can receive/generate an authorization token that can be used by notification component 514 to send the availability notification to the source. In an aspect, authorization component 516 can receive the authorization token from the client device from which the content item was uploaded in association with the upload.

Figure 6:
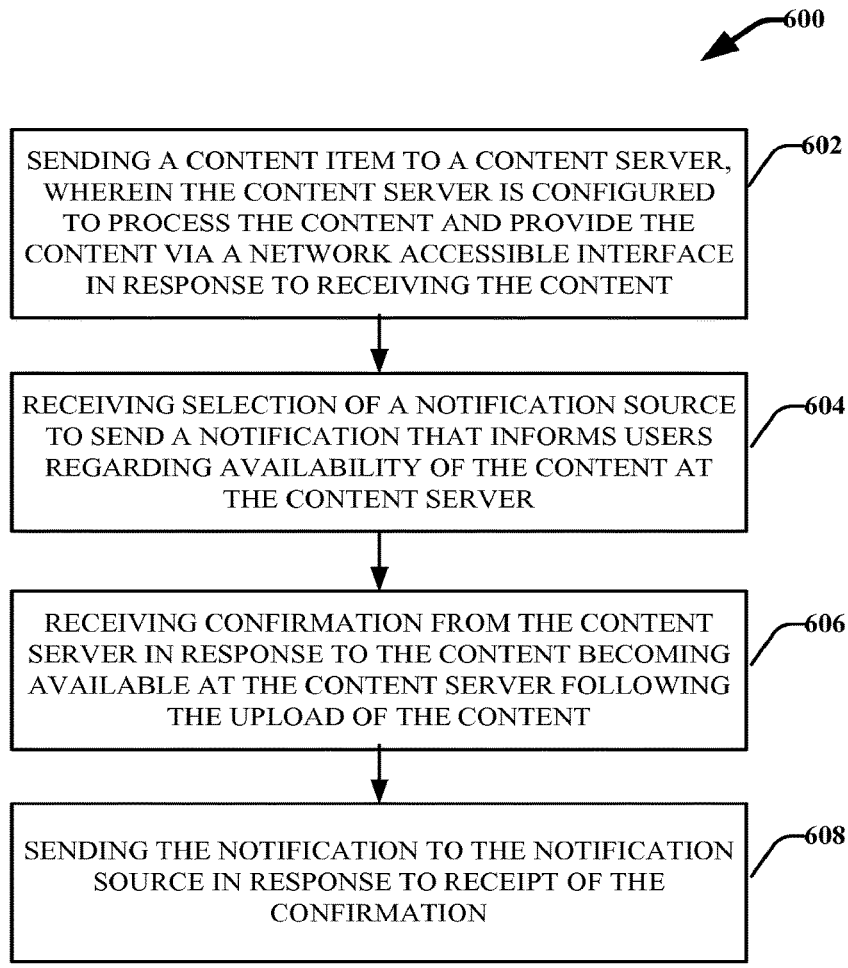
FIG. 6 presents an example method for delaying publicizing, at a second source, upload of a content item to a first source, until confirmation of availability of the content item at the first source, in accordance with various aspects and embodiments described herein.
Figure 7:
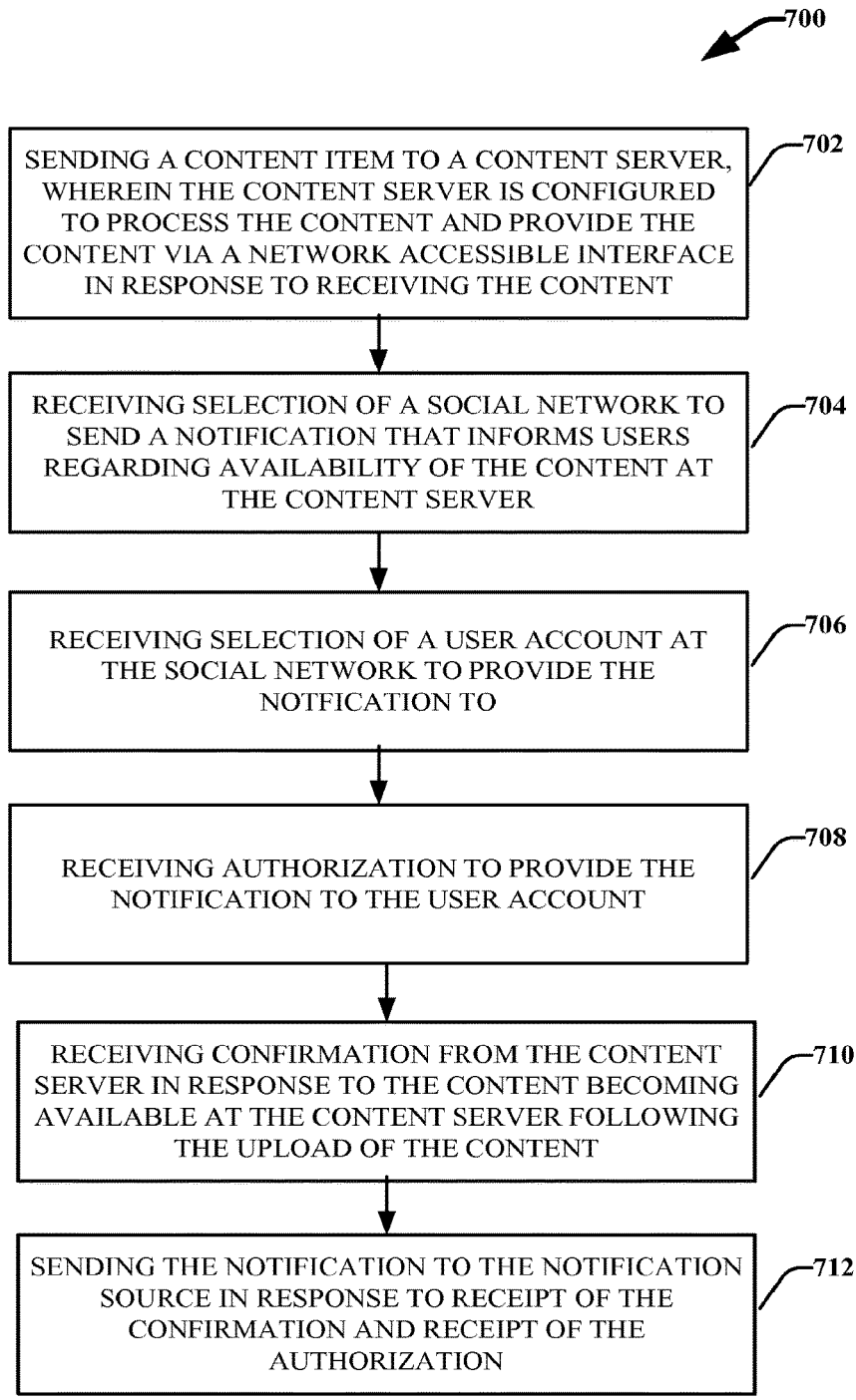
FIG. 7 presents an example method for delaying publicizing, at a second source, upload of a content item to a first source, until confirmation of availability of the content item at the first source, in accordance with various aspects and embodiments described herein.
Figure 8:
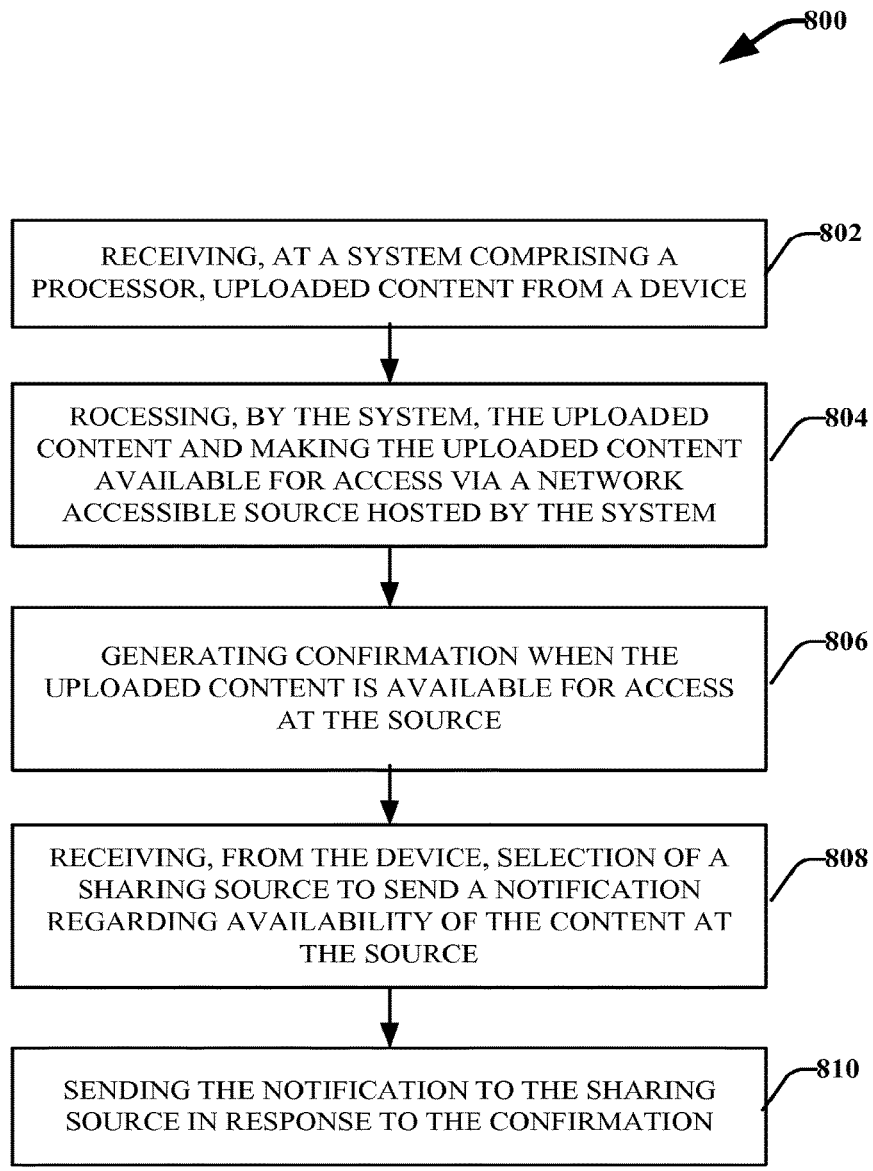
FIG. 8 presents an example method for delaying publicizing, at a second source, upload of a content item to a first source, until confirmation of availability of the content item at the first source, in accordance with various aspects and embodiments described herein.

In view of the example systems and/or devices described herein, example methods that can be implemented in accordance with the disclosed subject matter can be further appreciated with reference to flowcharts in FIGS. 6-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method for delaying publicizing, at a second source, upload of a content item to a first source, until confirmation of availability of the content item at the first source, to a new content source in accordance with aspects described herein. At 602, a content item is sent to a content server (e.g., via upload component 406), wherein the content server is configured to process the content and provide the content via a network accessible interface in response to receiving the content. For example, user can take a video on his smartphone and send it to a video hosting website for sharing on his personal profile page or channel established with the video hosting website.

At 604, selection is received of a notification source to send a notification that informs users regarding availability of the content at the content server (e.g., via share component 408). For example, at the time the uploader sends the video or before sending the video, the uploader can choose another user for sending the notification to as an email, text message or mobile notification. In another example, the uploader can choose a social network where the uploader has established an account for posting the notification to as a feed item. At 606, confirmation is received from the content server in response to the content becoming available at the content server following the upload of the content (e.g., via confirmation component 410). For example, confirmation can be received when the video has completed upload and processing at the content server and has been made available for viewing at the video hosting website. At 608, the notification is then sent to the notification source in response to receipt of the confirmation (e.g., via notification component 412).

FIG. 7 illustrates a flow chart of another example method 700 for delaying publicizing, at a second source, upload of a content item to a first source, until confirmation of availability of the content item at the first source, to a new content source in accordance with aspects described herein. At 702, a content item is sent to a content server (e.g., via upload component 406), wherein the content server is configured to process the content and provide the content via a network accessible interface in response to receiving the content. For example, user can take a video on his smartphone and send it to a video hosting website for sharing on his personal profile page or channel established with the video hosting website. At 704, selection is received of a social network to send a notification that informs users regarding availability of the content at the content server (e.g., via share component 408). At 706, selection of a user account at the social network for providing the notification to is received. At 708, authorization to provide the notification to the social network is received (via authorization component 414). For example, at the time the uploader sends the video or before sending the video, the uploader can choose a social network where the uploader has established an account for posting the notification to as a feed item. The uploader can further sign into his account to authorize sending notifications to the account on the user's behalf (e.g., by notification component 412). At 710, confirmation is received from the content server in response to the content becoming available at the content server following the upload of the content (e.g., via confirmation component 410). For example, confirmation can be received when the video has completed upload and processing at the content server and has been made available for viewing at the video hosting website. At 712, the notification is then sent to the notification source in response to receipt of the confirmation and receipt of the authorization (e.g., via notification component 412).

FIG. 8 presents an example method for delaying publicizing, at a second source, upload of a content item to a content server, until confirmation of availability of the content item at the content server, in accordance with aspects and embodiments described herein. At 802, uploaded content is from a device by a system having a processor, (e.g., by upload component 506). At 804, the uploaded content is processed by the system and made available for access via a network accessible source hosted by the system (e.g., by processing component 508). For example, the system can receive an uploaded video, process the video, and make the video available for streaming via a website. At 806, confirmation is generated when the uploaded content is available for access at the source (e.g., via confirmation component 510). At 808, selection of a sharing source to send a notification regarding availability of the content at the source is received from the device (e.g., via sharing component 512), and at 810, a notification the notification is sent to the sharing source in response to the confirmation.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
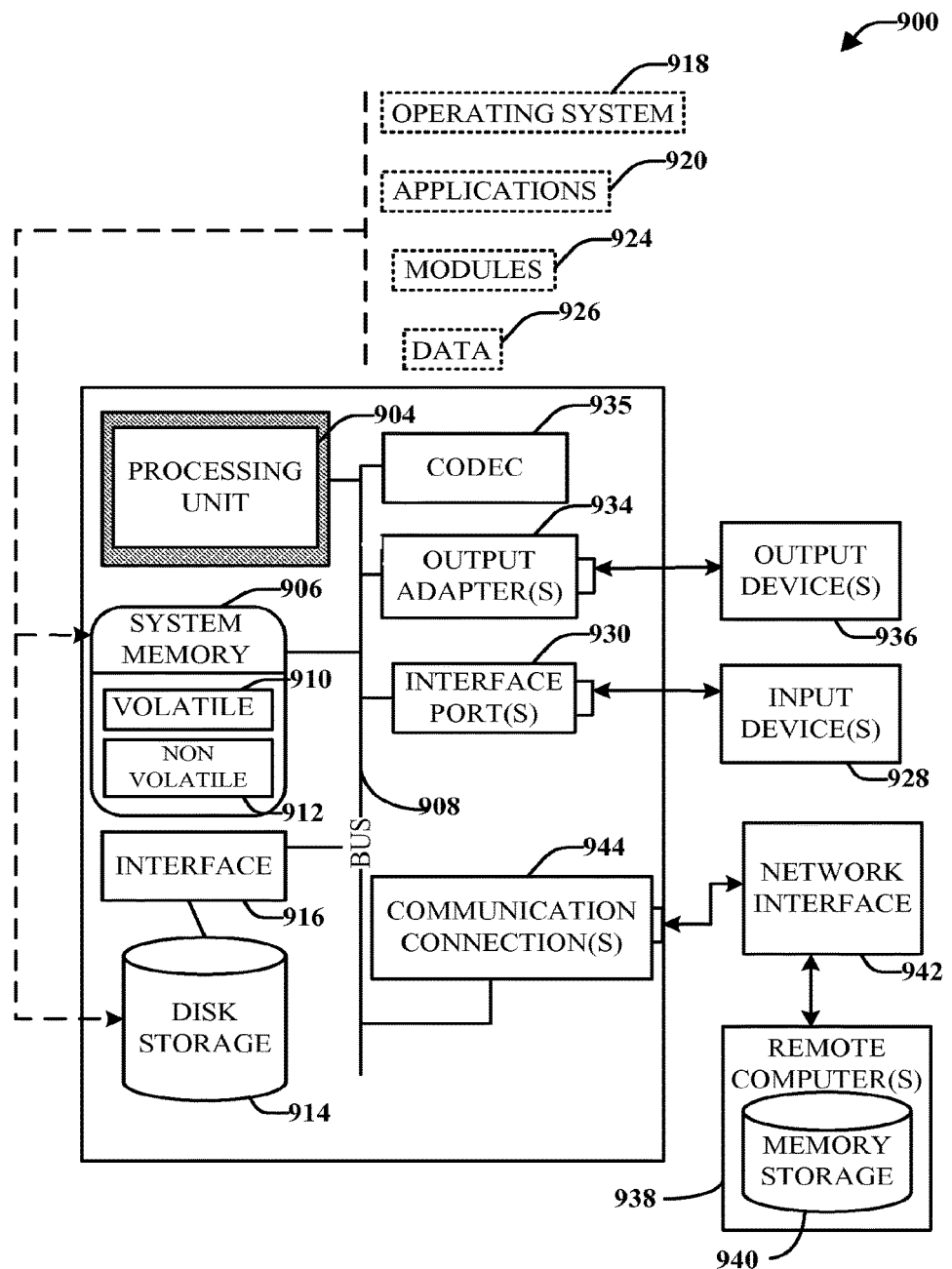
FIG. 9 is a schematic block diagram illustrating a suitable operating environment in accordance with various aspects and embodiments.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available suitable processors. Dual microprocessors and other multiprocessor architectures also can be employed as the processing unit 904.

The system bus 908 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s). Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
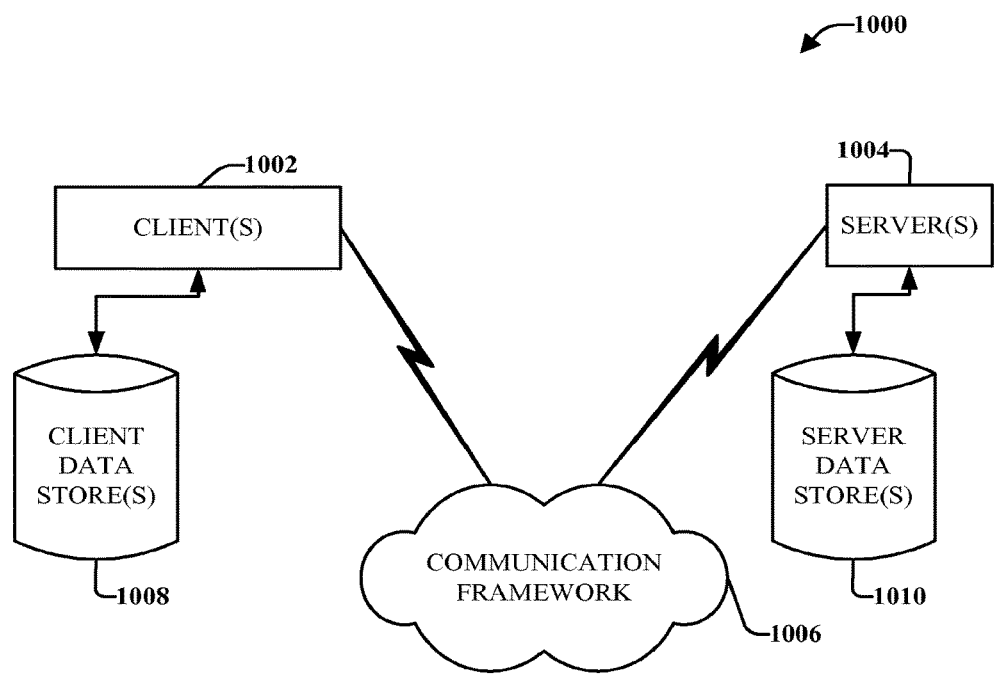
FIG. 10 is a schematic block diagram of a sample-computing environment in accordance with various aspects and embodiments.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a metadata, e.g., associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A system, comprising:
a memory that stores computer executable instructions;
a processor that, when executing the computer executable instructions stored in the memory, is configured to:
receive, at a user device, a request to upload a content item to a content server, wherein the request includes an indication of a selected sharing source to present a notification on an interface corresponding to the selected sharing source regarding availability of the content item at the content server for playback;
cause the content item to be transmitted from the user device to the content server;
detect whether a trigger event has occurred, wherein the detection includes inhibiting the notification from being posted on the interface corresponding to the selected sharing source prior to the trigger event being detected and wherein the trigger event includes receiving a confirmation message from the content server in response to the content item becoming available at the content server for playback following the transmission of the content item; and
automatically, without receiving user input, cause the notification to be presented on the interface corresponding to the selected sharing source in response to receiving the confirmation message.

2. The system of claim 1, wherein the processor is further configured to receive user input regarding information to include in the notification.

3. The system of claim 1, wherein the notification can include a link to the content item at the content server or a copy of the content item.

4. The system of claim 1, wherein the selecting sharing source comprises a social network.

5. The system of claim 4, wherein the processor is further configured to post the notification at the social network as a feed item.

6. The system of claim 4, wherein the processor is further configured to:
receive selection of a user account of the social network to provide the notification; and
provide the notification to the user account in response to receiving the confirmation message.

7. A system, comprising:
a memory that stores computer executable instructions;
a processor that, when executing the computer executable instructions stored in the memory, is configured to:
receive, at a content server, a content item from a device, wherein the content item is received along with an indication of a selected sharing source to present a notification on an interface corresponding to the selected sharing source regarding availability of the content item at the content server;
process the content item such that the content item is available for access via the content server;
generate a confirmation message in response to availability of a portion of the content item at the selected sharing source, and in response to a determination that a remainder of the content item is available at the content server by the time it is requested for viewing; and
automatically, without receiving user input from the device, cause the notification to be posted on the interface corresponding to the selected sharing source in response to the confirmation message.

8. The system of claim 7, wherein the selected sharing source comprises a social network.

9. The system of claim 8, wherein the processor is further configured to post the notification at the social network as a feed item.

10. The system of claim 8, wherein the processor is further configured to:
receive selection of a user account of the social network to provide the notification; and
provide the notification to the user account in response to receiving the confirmation message.

11. A system, comprising:
a memory that stores computer executable instructions;
a processor that, when executing the computer executable instructions stored in the memory, is configured to:
receive, at a user device, a request to upload a content item to a content server, wherein the request includes an indication of a selected sharing source to present a notification on an interface corresponding to the selected sharing source regarding availability of the content item at the content server for playback;
cause the content item to be transmitted from the user device to the content server;
detect whether a trigger event has occurred, wherein the detection includes inhibiting the notification from being posted on the interface corresponding to the selected sharing source prior to the trigger event being detected and wherein the trigger event includes receiving a confirmation message in response to availability of a portion of the content item at the selected sharing source, and in response to a determination that a remainder of the content item is to be available at the content server by the time it is requested for viewing; and
automatically, without receiving user input, cause the notification to be presented on the interface corresponding to the selected sharing source in response to receiving the confirmation message.

12. A method comprising:
receiving, using a hardware processor, a request to upload a content item to a content server, wherein the request includes an indication of a selected sharing source to present a notification on an interface corresponding to the selected sharing source regarding availability of the content item at the content server for playback;
causing the content item to be transmitted from the user device to the content server;
detecting whether a trigger event has occurred, wherein the detection includes inhibiting the notification from being posted on the interface corresponding to the selected sharing source prior to the trigger event being detected and wherein the trigger event includes receiving a confirmation message from the content server in response to the content item becoming available at the content server for playback following the transmission of the content item; and
automatically, without receiving user input, causing the notification to be presented on the interface corresponding to the selected sharing source in response to receiving the confirmation message.

13. The method of claim 12, further comprising receiving user input regarding information to include in the notification.

14. The method of claim 12, wherein the notification can include a link to the content item at the content server or a copy of the content item.

15. The method of claim 12, wherein the selected sharing source comprises a social network.

16. The method of claim 15, further comprising posting the notification at the social network as a feed item.

17. The method of claim 15, further comprising:
receiving a selection of a user account of the social network to provide the notification; and
providing the notification to the user account in response to receiving the confirmation message.

* * * * *